No. 690,548. Patented Jan. 7, 1902.
J. H. BAKER.
BRAKE BEAM.
(Application filed July 31, 1901.)
(No Model.) 4 Sheets—Sheet 1.
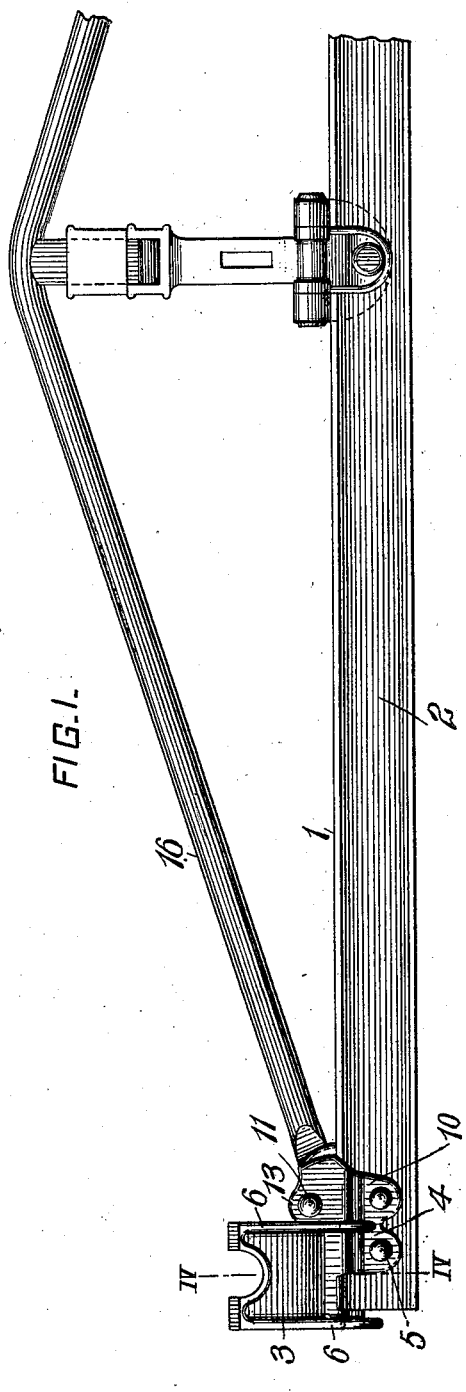
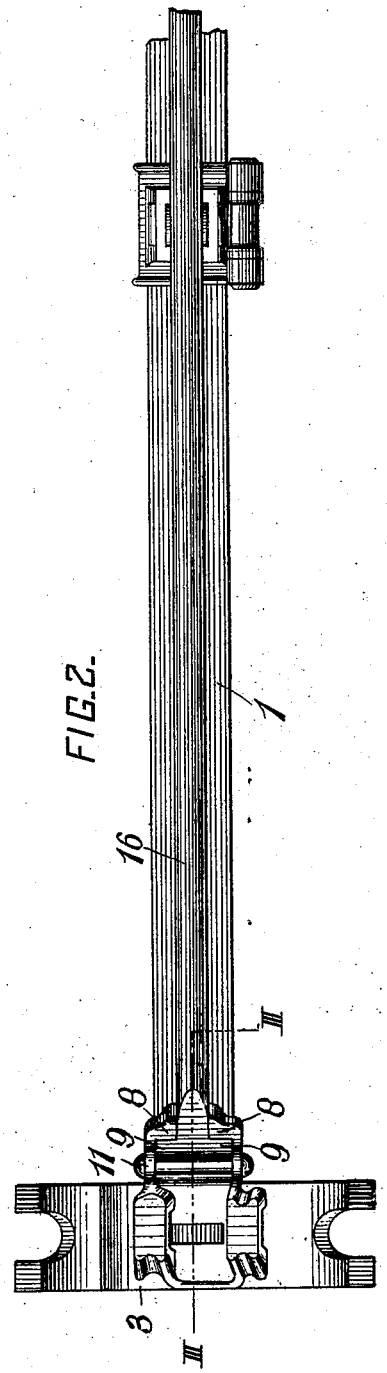
WITNESSES:
INVENTOR
James H. Baker
by Dennis S. Wolcott, Att'y.

No. 690,548. Patented Jan. 7, 1902.
J. H. BAKER.
BRAKE BEAM.
(Application filed July 31, 1901.)
(No Model.) 4 Sheets—Sheet 2.
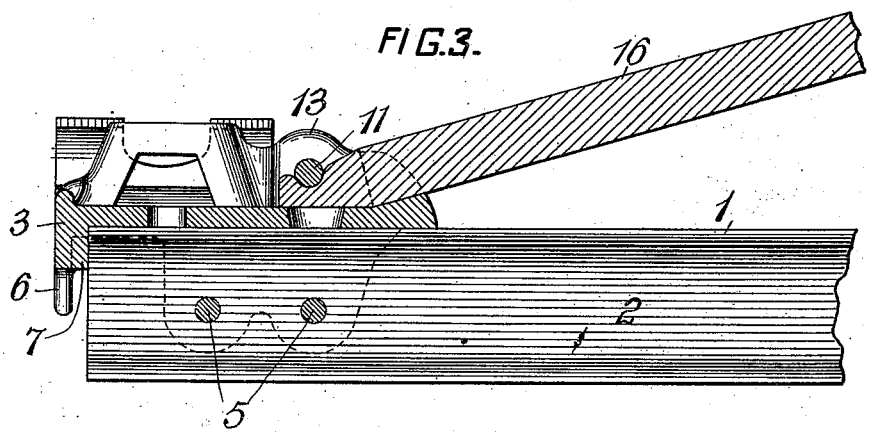
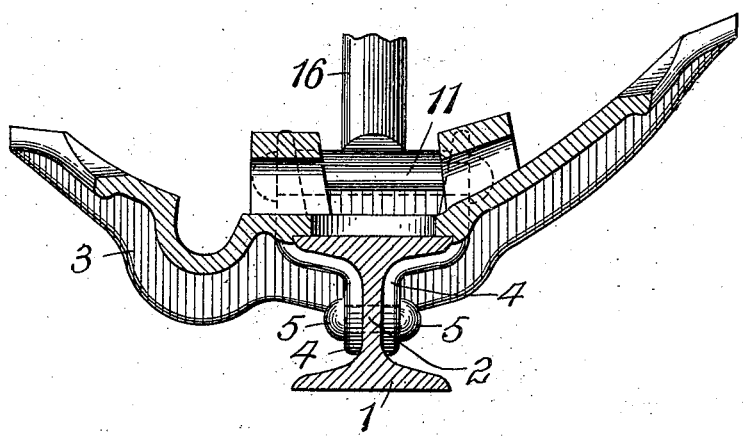
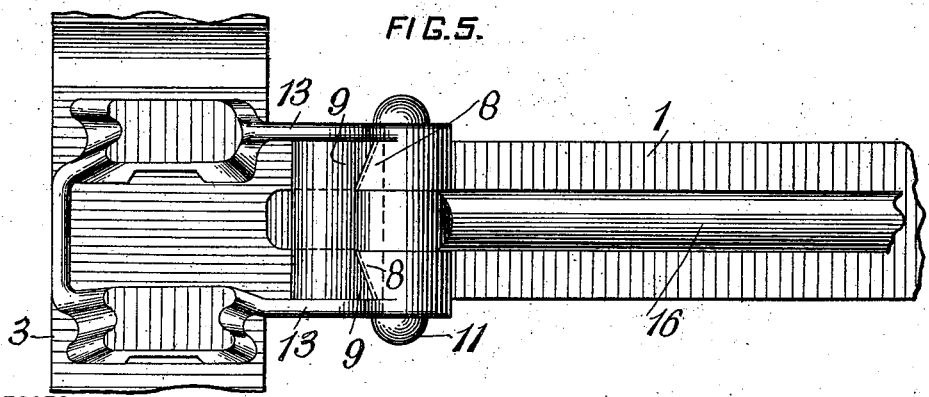
WITNESSES: INVENTOR
James H. Baker
by Dawn S. Wolcott Att'y.

No. 690,548. Patented Jan. 7, 1902.
J. H. BAKER.
BRAKE BEAM.
(Application filed July 31, 1901.)
(No Model.) 4 Sheets—Sheet 3.
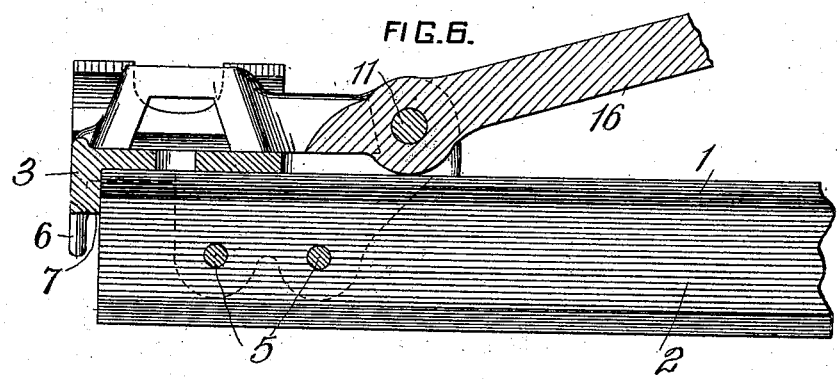
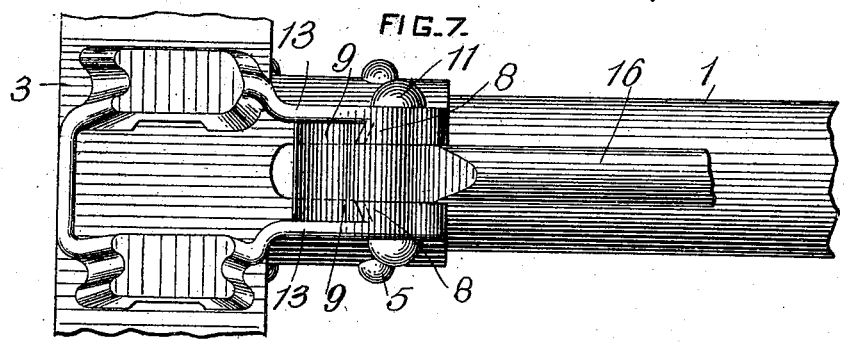
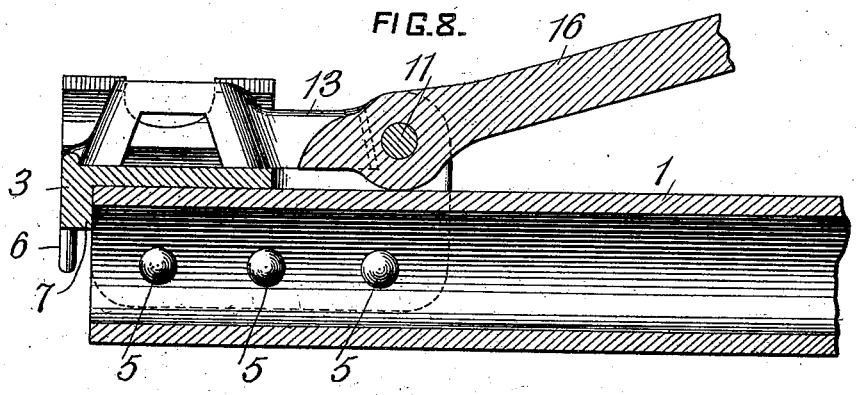
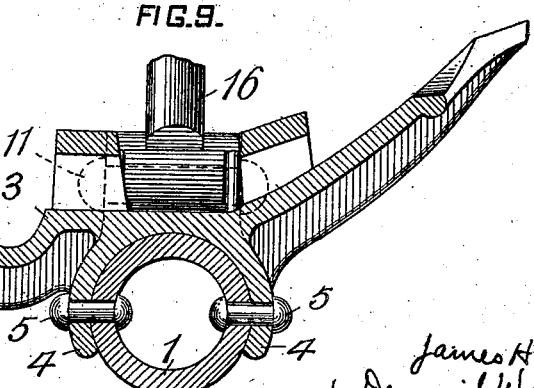
WITNESSES: INVENTOR
F. E. Gauther James H. Baker
Herbert Bradley by Dennis S. Wolcott Att'y No. 690,548. Patented Jan. 7, 1902.
J. H. BAKER.
BRAKE BEAM.
(Application filed July 31, 1901.)
(No Model.) 4 Sheets—Sheet 4.
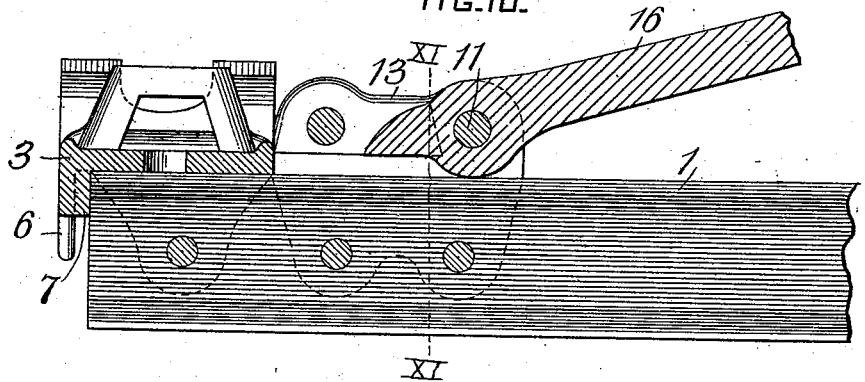
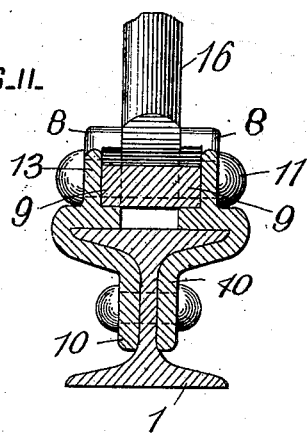
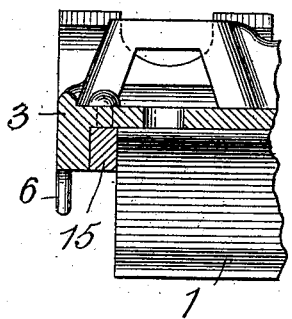
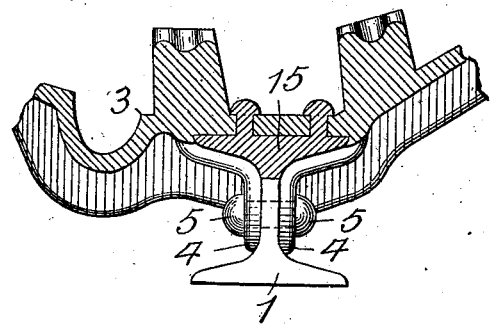
WITNESSES: INVENTOR
F. E. Gaither James H. Baker
Herbert Bradley by Dannis S. Wolcott Att'y.

UNITED STATES PATENT OFFICE.

JAMES H. BAKER, OF ALLEGHENY, PENNSYLVANIA, ASSIGNOR TO JAS. H. BAKER MANUFACTURING COMPANY, OF PITTSBURG, PENNSYLVANIA, A CORPORATION OF PENNSYLVANIA.

BRAKE-BEAM.

SPECIFICATION forming part of Letters Patent No. 690,548, dated January 7, 1902.

Application filed July 31, 1901. Serial No. 70,380. (No model.)

*To all whom it may concern:*

Be it known that I, JAMES H. BAKER, a citizen of the United States, residing at Allegheny, in the county of Allegheny and State of Pennsylvania, have invented or discovered certain new and useful Improvements in Brake-Beams, of which improvements the following is a specification.

The invention described herein relates to certain improvements in truss brake-beams for cars, and has for its object a construction whereby the several parts thereof may be secured together and placed under the desired strains of tension and compression without injury to any of the parts. In that class or kind of brake-beams where the compression member is formed by a tube the ends of the tension member are connected to the compression member generally by passing such ends through holes formed through the compression member at or near its ends, thereby greatly weakening the compression member in the direction of the greatest strains when in use. It has been endeavored to overcome this weakness by employing cast-metal caps or sockets fitting over the compression member and connected to the ends of the tension member. As constructed this form is objectionable for the reason that there is no assurance that the inner end walls of the sockets or caps will be smooth and regular and bear uniformly against the ends of the tubular compression member. Unless such uniformity of bearing is obtained the ends of the compression member become upset by the pull of the tension member against the same. Further, difficulty is encountered in getting accurate fit of the sleeves or sockets on the ends of the compression member.

It is the object of this invention to insure a large and uniform bearing of the shoe-heads or the means employed for connecting the tension and compression members upon the ends of the compression member and also to insure an accurate fitting or uniform even bearing of the shoe-heads or the connections for the tension member upon the compression member.

The invention is hereinafter more fully described and claimed.

In the accompanying drawings, forming a part of this specification, Figure 1 is an elevation of a portion of brake-beam embodying my improvements. Fig. 2 is an edge elevation of the same. Fig. 3 is a sectional view of one end of the beam on an enlarged scale, the plane of section being indicated by the line III III, Fig. 2. Fig. 4 is a transverse section on a plane indicated by the line IV IV, Fig. 1. Fig. 5 is a top plan view, on an enlarged scale, of a modification of my improvement. Fig. 6 is a sectional view of the same. Figs. 7, 8, and 9 are plan and longitudinal and vertical sections of further modifications. Fig. 10 is a sectional view showing the brake-shoe head and the anchor for the tension member formed independent of each other. Fig. 11 is a transverse section of the same on a plane indicated by the line XI XI, Fig. 10; and Figs. 12 and 13 are sectional detail views illustrating further modifications.

In the practice of my invention the compression member 1 is preferably formed of a structural shape, such as an I-beam, and the shoe-heads 3, which may be of any suitable form of construction, are provided with flanges 4, which are adapted to extend down under the flanges on one side of the structurally-shaped compression member and bear against the web portion 2 of such member. These flanges or wings are drawn together so as to fit snugly under the flanges of the compression member and against the web portion by means of one or more rivets 5, which pass through the web of the compression member. As the strains to which such members are subjected are in planes parallel with the web, the rivet-holes are in or approximately in the neutral line of such strains and do not, therefore, weaken the member. As is customary, the shoe-heads are provided on their rear faces with ribs or flanges 6, which serve to strengthen and reinforce the same, and it has been customary heretofore to employ one of these flanges as a stop to prevent the inward movement of the heads on the compression member. I prefer, however, to form an auxiliary shoulder 7 inside of these flanges, which shall serve as a stop or bearing for the ends of the compression member.

In order to attach the ends of the tension member 16 to the compression member, anchor-pieces exterior of the shoe-heads are preferably employed, such anchor-pieces consisting of shoulders 8 to form bearings for shoulders 9 of the tension member and the web portion or flanges 10, which extend partly around the compression member and are caused to fit thereon by means of one or more rivets 11, which serve to hold the anchor-pieces and the ends of the tension members in engagement. These anchor-pieces are secured to the compression member by means of rivets passing through the flanges 10 of the anchor-pieces and the wall of the compression member. It is preferred to form these anchor-pieces as lateral extensions of and integral with the brake-shoe heads, but independent of each other, as clearly shown in Figs. 1 to 9, inclusive; but such anchor-pieces may, if desired, be formed also independent of the shoe-heads and riveted to the compression member, as shown in Figs. 10 and 11. For some reasons this latter construction is preferable as permitting of the removal of the brake-shoe heads without loosening the tension member or destroying its connection with the compression member. In the construction shown in Figs. 1, 2, and 3 the shoulders of the tension member are held in position behind the shoulders of the anchor-pieces by means of a rivet passing above the ends of the tension member and through flanges 13 on the anchor-pieces in the rear of the shoulders 9. In this construction the tension member is not weakened by the formation of the rivet-holes therethrough. As shown in Figs. 5 and 6, the anchor-pieces are formed of two parts or members independent of each other, but both integral with the shoe-head, so that by the heading up of the holding-rivet 11, which passes through the anchor-pieces and the tension member in the rear of its shoulders, these two parts of the anchor-pieces are drawn tightly together against the sides of the tension and compression members. It is preferred that the bearing-faces of the shoulders 8 and 9 on the anchor-pieces and tension member, respectively, should be so inclined or beveled that the tension pull of the tension member will tend to draw the parts of the anchor-pieces in against the tension and compression members.

As clearly shown, my improvement can be applied to truss-beams having the compression member formed of tubes, as shown in Figs. 7, 8, and 9, the flanges 4 on the brake-shoe heads 3 and anchor-pieces being curved to correspond to the curved surfaces of the tubes. It will be observed that these webs or flanges on the head and anchor pieces do not extend entirely around the compression member and can therefore be made to fit the same accurately.

Considerable difficulty is at times experienced in separating the parts of the beam when it is desired to renew parts of the same, such difficulty being caused by the tension or pull of the tension member on the anchors, whereby the ends of such members are secured to the compression member. In order to render the separation of these parts easy without slacking up the strut of the truss, I provide removable blocks or sections as bearing-pieces 15 between the ends of the compression member and the brake-shoe heads, as shown in Figs. 12 and 13. These removable bearing-pieces are lightly riveted in place, the rivets being preferably formed integral with the bearing-pieces, and when it is desired to repair a beam these rivets are cut and the bearing-pieces pried out of position, thereby allowing the heads to move inward and relieve the tension of the tension member. When new heads have been placed in position, the parts can be brought back to the original tension by driving new bearing-pieces into position between the ends of the compression member and the shoulders on the new head and riveting the bearing-pieces in position.

It will be readily understood by those skilled in the art that as the flanges on the heads and anchor-pieces do not extend entirely around the compression member in the form of a sleeve they can be drawn against and caused to fit the compression member snugly by the attaching-rivets.

I claim herein as my invention—

1. A brake-beam having in combination, a compression member, a tension member, brake-shoe heads secured directly to the compression member, and independent anchor-pieces secured to the compression member at or adjacent to both ends thereof and inside the brake-shoe heads and adapted to be secured to the tension member, substantially as set forth.

2. A brake-beam having in combination a compression member, a tension member, a strut and brake-shoe heads secured to the compression member and anchor-pieces independent of the brake-shoe heads secured to the compression and tension members and capable of removal from the compression member independent of the brake-shoe heads, substantially as set forth.

3. A brake-beam having in combination a compression member, a tension member, a strut, a brake-shoe head secured to the compression member, independent anchor-pieces adapted to be secured directly to the compression and tension members, substantially as set forth.

4. A brake-beam having in combination a compression member, a tension member, a strut, a brake-shoe head secured to the compression member, independent anchor-pieces provided with shoulders adapted to engage shoulders in the tension member, and means for drawing the anchor-pieces inwardly against the compression and tension members, substantially as set forth.

5. A brake-beam having in combination a compression member, a tension member, a strut, a brake-shoe head carried by the compression member and connected to the tension member, and a removable bearing-piece interposed between the head and compression member, substantially as set forth.

6. A brake-beam having in combination, a compression member, a tension member, a strut, a brake-shoe head and anchor-pieces connected to the tension member, the head and anchor-pieces being provided with flanges extending partially around the compression member and caused to fit the same closely by the securing-rivets, substantially as set forth.

7. A brake-beam having in combination a compression member, a tension member provided with inclined shoulders, a strut, a brake-shoe head carried by the compression member, anchor-pieces provided with inclined shoulders adapted to engage the shoulders in the tension member whereby the anchor-pieces are drawn inwardly toward the tension and compression members, substantially as set forth.

In testimony whereof I have hereunto set my hand.

JAMES H. BAKER.

Witnesses:
DARWIN S. WOLCOTT,
F. E. GAITHER.